United States Patent [19]

Smith

[11] Patent Number: 4,999,734

[45] Date of Patent: Mar. 12, 1991

[54] ELECTRODE ARRAY MADE FROM CONCAVE ELECTRODES FOR METER READING DEVICE

[75] Inventor: Edward P. Smith, North Richland Hills, Tex.

[73] Assignee: Siecor Corporation, Hickory, N.C.

[21] Appl. No.: 460,019

[22] Filed: Jan. 2, 1990

[51] Int. Cl.⁵ .................... H01G 5/01; G08C 19/10
[52] U.S. Cl. ........................ 361/278; 340/870.37
[58] Field of Search .............. 361/277, 278, 298, 299; 364/480; 340/870.37

[56] References Cited

U.S. PATENT DOCUMENTS 4,238,781 12/1980 Vercellotti et al. ............ 340/870.37
4,924,407 5/1990 King et al. ...................... 364/480

Primary Examiner—Donald A. Griffin
Attorney, Agent, or Firm—Roy B. Moffitt

[57] ABSTRACT

An electrode array for use in an apparatus for remotely monitoring the position of a rotatable member as the rotatable member is rotated by an axle about an axis. The array includes a substrate composed of a three-layer composite having first and second surfaces, a plurality of spaced-apart, excitable electrodes defining a center portion disposed on the first surface, an aperture in the substrate located in the center portion for receiving the axle, a center electrode in the center portion spaced apart from the axle circumscribing the aperture, a guard composed of a first conductive strip disposed in the center portion on the first surface spaced apart from and located between the spaced apart excitable electrodes and the center electrode. Each of the excitable electrodes have a concave free edge that delimits a part of the center portion. The excitable electrodes and the meter hand have predetermined areas, so that the area of any given member of the excitable electrodes subtended by the meter is substantially constant as the meter hand traverses across such electrode.

8 Claims, 9 Drawing Sheets

See Figure 13.

See Figure 13.

ELECTRODE ARRAY MADE FROM CONCAVE ELECTRODES FOR METER READING DEVICE

BACKGROUND OF THE INVENTION

This invention relates to a apparatus for determining the orientation of a rotatable meter hand relative to a dial spaced apart from the meter hand. More particularly, the invention is concerned with an electrode array for creating a current signal (amplitude) subsequently used to identify the position of a meter hand relative to a dial face.

GENERAL DESCRIPTION OF THE PRIOR ART

A prior art remote meter reading device (see FIG. 3), made available by Siecor Corporation under Part Number SE200, uses an electrode array like that shown in FIGS. 1 and 2 in combination with a transimpedance amplifier, to sense the position of a meter's hand. Once this is done, it encodes the reading and sends it over a cable in ASCII form to an interface device, like a TIU-100 (Telephone Interface Device also sold by Siecor Corporation) where the reading can be used for monitoring power usage and customer billing. It employs a four-layer PC Board and a microprocessor, analog and digital circuitry and five encoder dial arrangements. Each encoder dial uses an electrode array of ten pads (excitable electrodes), arranged around an inner ring, each pad coinciding with one of the ten meter hand positions. The excitable electrodes or pads and inner ring are made of copper PC board metalization connected to electronic circuitry. To sense the position of the meter hand, a pulse or waveform is generated and routed to a predetermined one of the ten pads on the dial being tested. If the meter hand of this predetermined dial is located over the pad being tested, it acts like an additional capacitor in parallel to capacitance already formed between excitable electrode and a center electrode. When the meter hand is over the pad being excited, the capacitor formed conducts the high frequency pulses to the inner ring (center conductor) while sharply attenuating lower frequencies, most of which are noise. Since the capacitance thus formed is small, the frequency corner (frequencies below the corner are attenuated and frequencies above the corner are passed) created by the capacitance and the first stage of an amplifier connected thereto is approximately 159 KHz. When the meter hand is not present, the frequency corner is approximately 640 KHz. When a meter hand is not over the pad being excited, only stray capacitance exists, through the PC board and the relatively long air path from the excitable electrode pad to the inner ring or center conductor. This prior art encoder makes use of the difference in frequency corners by sending a signal of approximately 130 KHz to 175 KHz to the pad being measured or analyzed. If the meter hand is not there, the resultant signal output by the first stage of the high performance wide bandwidth amplifier is very small. If the meter hand is over the pad, the resultant signal is relatively large.

DESCRIPTION OF PRIOR ART APPARATUS

Shown by element 1 of FIG. 1, is a cross sectional view of an excitable electrode pad array forming a part of the previously identified prior art Siecor SE200 Encoder. It has a center electrode 2 and guard 3, all on the same surface, disposed between a meter dial face and a rotatable meter hand. Element 1 of FIG. 2 is a plan view of the cross sectional view shown in FIG. 1. Element 6 is a meter backboard and on top of the meter backboard is element 7, a meter dial face. Disposed over meter dial face 7 is plate 8, a substrate. Meter dial face 7 and substrate 8 can be combined on one substrate. On the uppermost surface of substrate 8, there is disposed center electrode 2, guard 3 and center electrode 2. It will be noted that center electrode 2 at least partially circumscribes and is spaced apart from axle 5. Spaced apart from center electrode 2 is guard member 3 and spaced apart from guard member 3 is the electrode array 4-1 through 4-10. Note like element numbers of FIG. 2. Excitable electrodes 4-1 through 4-10 represent the ten readable positions that can be read by the encoder. Attached to axle 5 and rotatable about axle 5 is hand 9-10. It will be noted that metal portion of hand 9-10 (the under surface) is spaced apart from axle 5 and its uppermost portion is coated by a plastic or a dielectric 10.

Referring now to the prior art electrode array of FIG. 2, electronic guard 3 is connected to a constant DC voltage (see element 20 of FIG. 3) through leads, Z and Z. Lead Y transmits current from center electrode 2 to process circuitry.

Reference is now made to FIG. 3, showing a prior art encoder circuit (process circuitry). Element 21 is a square wave generator and is connected through leads 22, 23, and 24 and to dials 7, of which there are five in number and have a structure like that of FIGS. 1 and 2. Through leads 25, dials 7 are connected to multiplexer 12. In some instances, amplifiers (op-amps) 11 are inserted between dial 7 and multiplexer 12 as shown. Each dial is connected through leads 26 and 27, to DC reference voltage 20, and to transimpedance amplifier 13 via lead 27. Multiplexer 12 is connected to transimpedance amplifier 13 by lead 28. Bandpass filter 14 is connected through lead 29 to transimpedance amplifier 13. Peak-to-peak detector 15 is connected to bandpass filter 14 through lead 30. Analog to digital converter 16 is connected to the peak-to-peak detector 15 by lead 40 and to microprocessor 17 through lead 41. Smart box 18, a transmitter and receiver, is connected to microprocessor 17 through lead 42 and through lead 43 to central office 19.

The above-described circuit of FIG. 3 works as follows: The transmitter-receiver (smart-box) 18 is adapted to receive a signal from central office 19 and is responsive to the signal to activate the microprocessor 17 to control the AC voltage source 21 so that any given electrode 4-1 to 4-10 of any given dial may be excited upon command. When hand 9-10 is over electrode 4-6 (note FIG. 1), a capacitance is created and proportional current flows off of the center electrode 2, greater than there would have been in the absence of a hand 9-10. DC reference voltage source 20 supplies a steady DC bias voltage (E) to each guard member 3, associated with each dial by means of leads Z and Z. By means of transimpedance amplifier 13, voltage (E) is applied to each central electrode. The DC reference voltage source 20 also supplies voltage (E) to the noninverting input port of the transimpedance amplifier 13. Because of the virtual ground characteristics of transimpedance amplifier 13, the inverting output port of transimpedance amplifier 13 is held essentially at voltage (E). Thus, the negative input port of transimpedance amplifier 13 is at the same voltage as the noninverting input port.

Multiplexer 12, under the control of microprocessor 17, determines which current from which central electrode of which dial is allowed to pass onto lead 28. This current (IX) is the current created by the charge existing between the excited electrode central electrode and hand 9-10. Obviously, IX is changing as the dial hand moves. Current IX passes on to lead 28 through transimpedance amplifier 13 which converts such a current into a low voltage (EX), such voltage arising out of the capacitance coupling of the dial hand and the excited electrode. E is the constant bias voltage on lead 27 applied to the non-inverting input port of transimpedance amplifier 13. The difference of these two voltages appear on lead 29 when referenced to E. Band pass filter 14 is used to filter out any noise and the sum of EX plus E, minus the noise, appears on lead 30 Peak-to-peak detector 15 strips out the voltage associated with bias voltage E and converts it to an equivalent analog DC voltage denoted EXPP. Such voltage is the function of the capacitance coupling of meter hand 9-10, center electrode 2, and its associated excited electrode and appears at the analog digital converter 16, which converts it to a microprocessor usable digital word. This digital word is read by a microprocessor 17 and is stored until the same process is performed for all 50 excitable electrode-center electrode pairs, ten pairs per dial and five dials. Microprocessor 17 then processes this information to determine the five dial hand positions (ten positions possible for each dial) for the meters previously described and subsequently transmits this "meter reading" to the "smart box" 18 via lead 42, which in turn transmits the "meter reading" to the central office 19 by means of lead 43.

BRIEF DESCRIPTION OF THE INVENTION

The invention is an electrode array used with an apparatus for remotely monitoring the position of a rotatable member (a dial hand), relative to a substrate spaced apart from the dial hand, as the dial hand is rotated by an axle about an axis. The array is composed of spaced apart excitable tooth shaped electrodes (pads) disposed on one surface of the substrate facing the dial hand delimiting a center portion, a center electrode on the substrate on the same substrate surface as the excitable electrodes in the center portion spaced apart from and circumscribing the axle. It is also spaced apart from the dial hand and the spaced apart electrodes. The substrate array consists of a three-layer composite having first and second surfaces with the spaced apart excitable electrodes defining a center portion on the first surface of the substrate. The substrate contains an aperture, located in the center portion, for receiving an axle to which a meter hand is attached to a terminal end portion. The center electrode circumscribes the aperture. A guard composed of a first conductive strip is disposed in the center portion on the first surface of the three layer composite and at least partially circumscribes the aperture. It is spaced apart from and located between the spaced apart excitable electrodes and the center electrode. Also included is a second conductive strip disposed on the second surface of the three layer substrate composite substrate, in electrical communication with the center electrode and a third and fourth conductive strip also disposed on the second surface of the three-layer composite substrate in electrical communication with the guard. The third and fourth conductive strips are disposed on the second surface, which is the exposed surface of the third layer of the three-layer composite, spaced apart from and positioned laterally on opposite sides of the second conductive strips. The middle layer of the three-layer composite substrate is a metalized layer. It is in electrical contact with the guard and electromagnetically shields or isolates the two outer layers of the three-layer composite substrate.

With respect to the prior art apparatus, more particularly FIGS. 1 and 2, the hand pattern taught by this apparatus has a large capacity for coupling between the excited pads, the central electrodes, or receiver section. When determining the position of a meter hand (9, 10) by a capacitance means, a tooth shaped excitable electrode, such as 4-1 through 4-10 (FIG. 8), results in a more consistent coupling magnitude as the dial hand 9, 10 traverses its arc over the excitable electrodes, compared to the coupling magnitude achieved with non-tooth shaped electrodes (FIG. 4). With respect to the non-tooth-shaped prior art electrodes as above described, a problem has been encountered which involves guard 2, the receiving electrode 3, and excitable electrodes 4-1 to 4-10 of the multi-layered printed circuit board described in FIG. 5. This problem arises when the meter hand 9, 10 is positioned at a given distance from the surface of the non-tooth-shaped excitable electrodes, directly between two adjacent excitable electrodes. See FIG. 9B for example. Because the meter hand 9, 10 may equally cover two excitable electrodes, the capacitance between one of the partially covered excitable electrodes and the receiving electrode 2 should be equal to the capacitance between the other partially covered excitable electrode. This capacitance is referred to hereafter as the cross over capacitance. The capacitance between any one of the remaining eight excitable electrodes and the receiving electrode 2 and the receiving electrode 2 is relatively small, compared to the cross-over capacitance, due to the absence of hand 9, 10 over those excitable electrodes. Such capacitance is referred to hereafter as the base line capacitance.

When meter hand 9-10 is positioned directly over an excitable electrode, see FIG. 2 for example, capacitance between the receiving electrode 2 and the excitable electrode covered by the meter hand is greater than the crossover capacitance. This capacitance is referred to herein as the peak capacitance.

If the cross-over capacitance and the peak capacitance are not relatively equal, any algorithm used in determining the hand position necessary has to be complicated. The herein disclosed invention is directed towards minimizing the difference between the crossover capacitance and the peak capacitance by changing the shape of the excitable electrode so that the relative capacitance will be substantially constant as the meter hand traverses across the above excitable electrode.

BRIEF DESCRIPTION OF THE DRAWINGS

FIG. 11 also illustrates the relative capacitance for each of the ten prior art electrodes as the meter hand position $\Phi$ is varied from 0° to 360° with respect to vertical.

FIG. 12 also illustrates the relative capacitance for each of the ten tooth-shaped pads as the meter hand position $\Phi$ is varied from 0° to 360° with respect to vertical.

FIG. 13 also illustrates that $\Phi$ of FIG. 12 increases as the meter hand is rotated clockwise from vertical. For the hand position shown, $\Phi$ is equal to 36°.

DETAILED DESCRIPTION OF THE INVENTION

Figure 1:
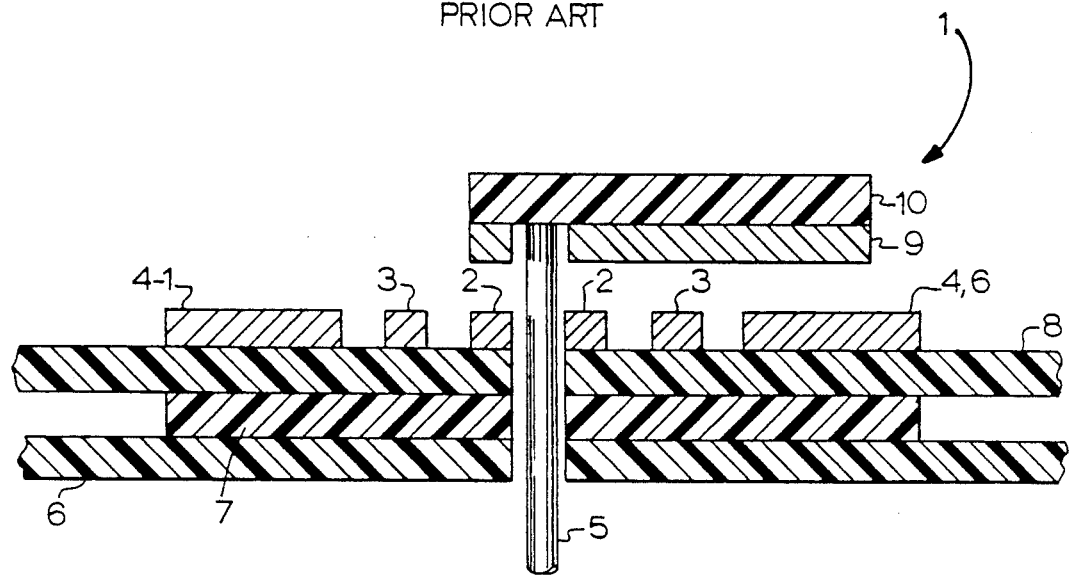
FIG. 1 is a cross sectional view of a prior art excitable electrode (pad) array having a center electrode and a guard, all disposed between a meter dial face and a rotatable member (dial hand).
Figure 2:
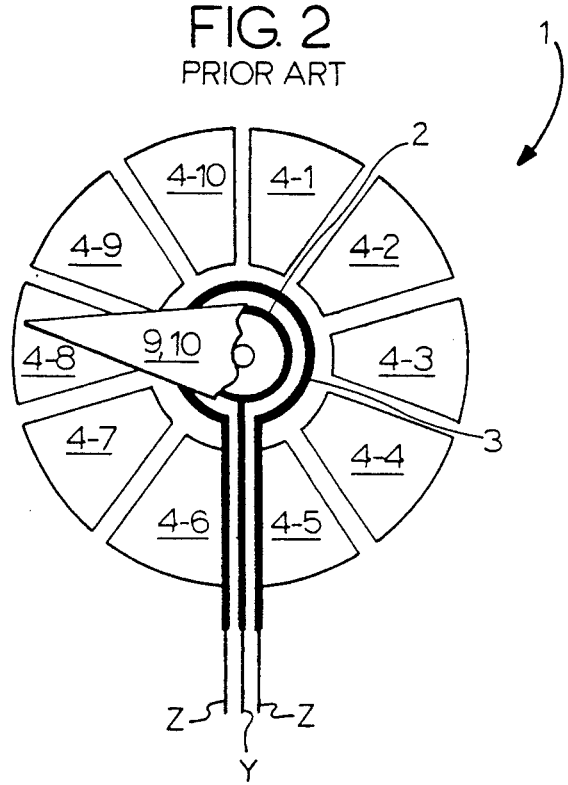
FIG. 2 is a plan view of a prior art single electrode array including a central electrode and a guard.
Figure 4:
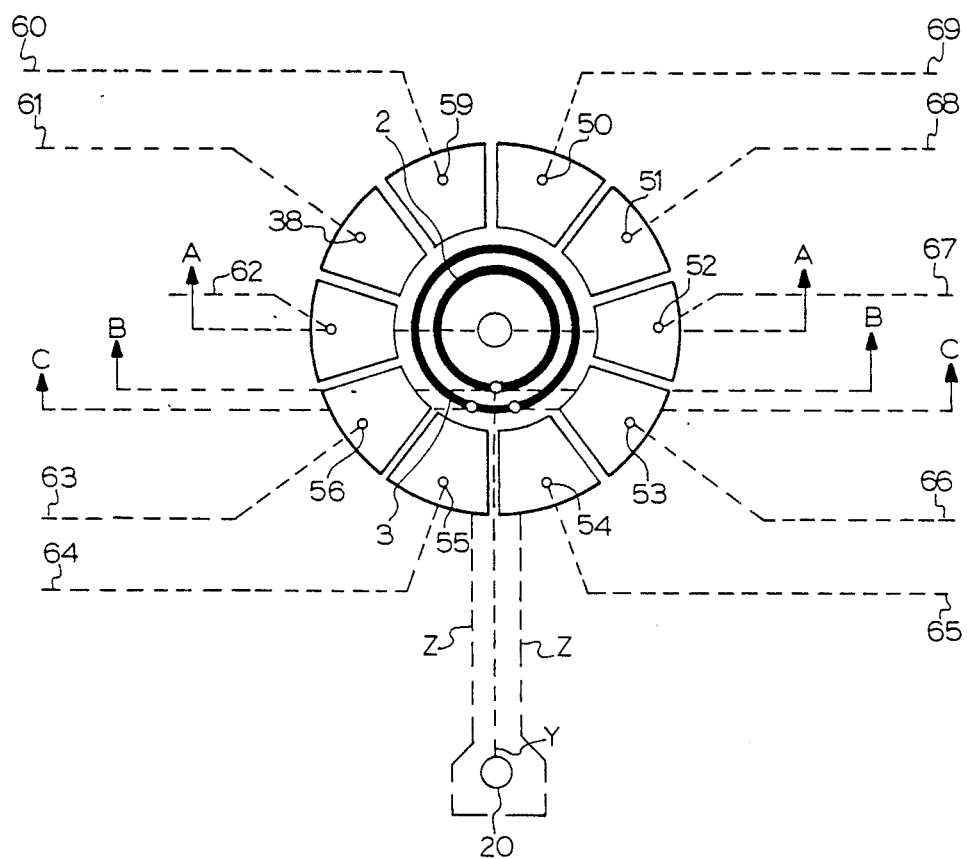
FIG. 4 is a plan view of a prior art electrode array.
Figure 5:
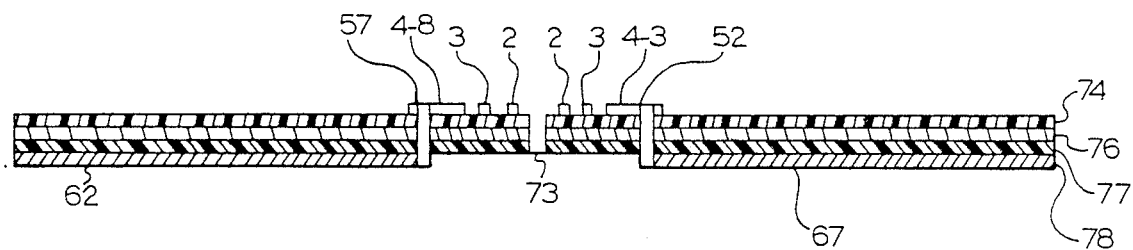
FIG. 5 is a cross sectional view of the electrode array of FIGS. 4 and 8 along lines A—A of FIG. 4.
Figure 6:
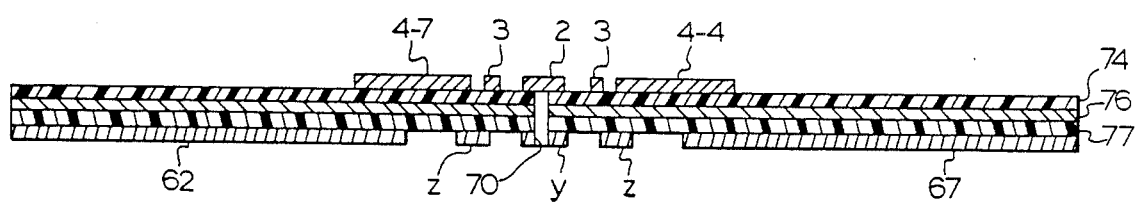
FIG. 6 is a cross sectional view of the electrode array of FIGS. 4 and 8 along lines B—B.
Figure 7:
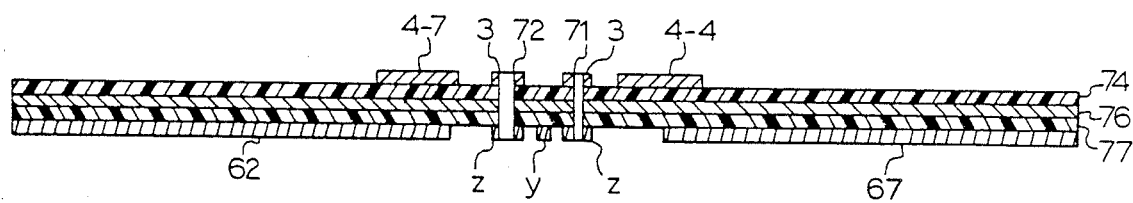
FIG. 7 is a cross sectional view of the electrode array of FIGS. 4 and 8 along lines C—C.

Helpful to the appreciation of the present invention is an understanding of the prior art electrode array structure disclosed in FIGS. 4, 5, 6, and 7. FIGS. 5, 6, and 7 are cross sectional views along A—A, B—B, and C—C respectively of FIG. 4. It is to be understood that the array shown in FIGS. 4, 5, 6, and 7 may be substituted for the prior art array shown as element 1 in FIGS. 1 and 2, along with the addition of axle 5 and meter hand 9-10. Axle 5 is to be received in aperture 73 and is affixed to a meter hand 9-10, which extends over receiving electrode 2, guard 3, and is traversable over the individual faces (uppermost surfaces) of excitable electrodes 4-1 through 4-10.

Figure 3:
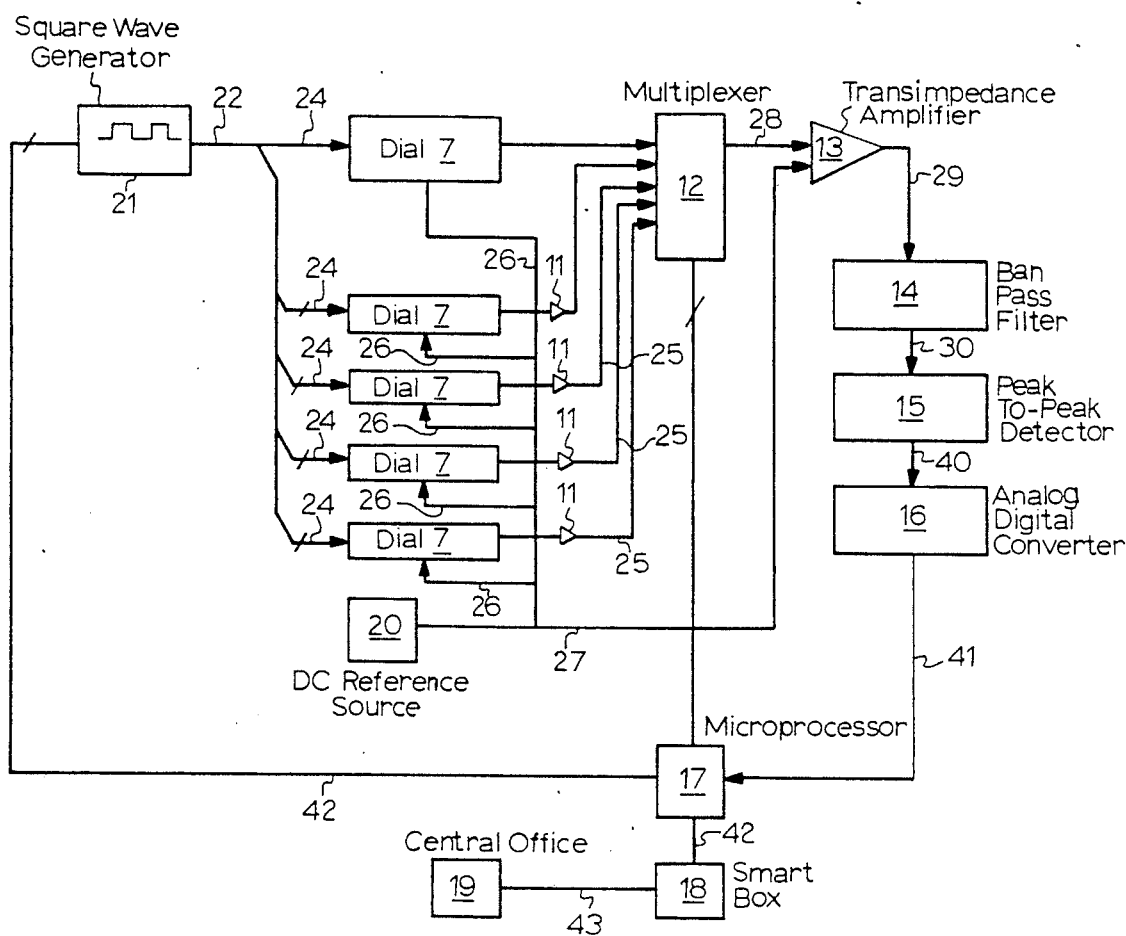
FIG. 3 is a schematic of a prior art circuitry employed by prior art encoders.

Viewing FIG. 4, it is to be noted that there is a plurality of spaced apart, excitable electrodes 4-1, 4-2, 4-3, 4-4, 4-5, 4-6, 4-7, 4-8, 4-9, and 4-10. Each one of these electrodes is affixed to a substrate, made up of layers 74, 76, and 77. Layers 74 and 77 are made of fiberglass impregnated with a suitable resin. Layer 76 is a metalized conductive layer. Excitable electrodes 4-1 through 4-10 each contain and are in electrical contact with a feed through. For example, excitable electrode 4-1 contains feed through 50, excitable electrode 4-2 contains feed through 51, excitable electrode 4-3 contains feed through 52, excitable electrode 4-4 contains feed through 53, excitable electrode 4-5 contains feed through 54, excitable electrode 4-6 contains feed through 55, excitable electrode 4-7 contains feed through 56, excitable electrode 4-8 contains feed through 57, excitable electrode 4-9 contains feed through 58, and excitable electrode 4-10 contains feed through 59. The purpose of these feed throughs is to create an electrical path from a particular excitable electrode on the uppermost surface of FIG. 5 to a particular excitable electrode interconnect to another surface (for example lowermost surface of substrate of FIG. 5). For example, excitable electrode 4-3 contains feed through 52, which places excitable electrode 4-3 in electrical communication with excitable electrode interconnect 67. In like manner, feed through 57 is in electrical communication with excitable electrode 4-8 and excitable electrode interconnect 62. All other feed throughs connect a particular excitable electrode with a receiving electrode interconnect as shown. All excitable electrode interconnects (elements 60-69) are metalized strips that are electrically conductive. Excitable electrode interconnect 67, shown by a dotted line in FIG. 4, is the same excitable electrode interconnect 67 shown in cross section in FIG. 5. Element Z is a conductive strip connected to guard 3 by feed throughs 71 and 72 and is connected to a constant potential like that of element 20 of FIG. 3. Element Y is a conductive strip forming a receiving electrode interconnect disposed on the bottom of layer 77 and is electrically connected to center electrode 2 by feed through 70. It will be noted that in FIG. 4 interconnects for the center electrode, guard and excitable electrodes are shown in dotted lines. Circumscribing aperture 73 is receiving or central electrode 2 and circumscribing and spaced apart from receiving electrode 2 is guard 3. It will be noted that guard 3 is in electrical communication with feed throughs 71 and 72 and receiving, or center electrode 2, is in electrical communication with feed through 70. Feed throughs 71 contains feed through 59. The purpose of these feed throughs is to create an electrical path from a particular excitable electrode on the uppermost surface of FIG. 5 to a particular excitable electrode interconnect to another surface (for example lowermost surface of substrate of FIG. 5). For example, excitable electrode 4-3 contains feed through 52, which places excitable electrode 4-3 in electrical communication with excitable electrode interconnect 67. In like manner, feed through 57 is in electrical communication with excitable electrode 4-8 and excitable electrode interconnect 62. All other feed throughs connect a particular excitable electrode with a receiving electrode interconnect as shown. All excitable electrode interconnects (elements 60-69) are metalized strips that are electrically conductive. Excitable electrode interconnect 67, shown by a dotted line in FIG. 4, is the same excitable electrode interconnect 67 shown in cross section in FIG. 5. Element Z is conductive strip connected to guard 3 by feed throughs 71 and 72 and is connected to a constant potential like that of element 20 of FIG. 3. Element Y is a conductive strip forming a receiving electrode interconnect disposed on the bottom of layer 77 and is electrically connected to center electrode 2 by feed through 70. It will be noted that in FIG. 4 interconnects for the center electrode, guard and excitable electrodes are shown in dotted lines. Circumscribing aperture 73 is receiving or central electrode 2 and circumscribing and spaced apart from receiving electrode 2 is guard 3. It will be noted that guard 3 is in electrical communication with feed throughs 71 and 72 and receiving, or center electrode 2, is in electrical communication with feed through 70. Feed throughs 71 and 72 are in electrical communication with conductive strips Z—Z. See FIGS. 2 and 4. This places guard 3 in electrical contact with conductive strips Z—Z. Feed through 70 is in electrical contact with central electrode 2 and conductive strip Y, which is for connection with multiplexer 12 through lead 25.

To operate the apparatus as above described, an AC voltage signal is applied to each excitable electrode 4-1 through 4-10 via the excitable electrode interconnects 60 through 69. Capacitance is induced between the receiving electrode and the excitable electrode that is excited with the AC voltage. The magnitude of this capacitance is dependent on the presence or absence of the meter hand 9-10 over each excitable electrode. For example, see FIG. 1. The current in the receiving or center electrode 2 is thus also dependent upon this capacitance. This current is then carried to a current measuring device (see FIG. 3) via the receiving electrode interconnects 60 through 69. Guard 3 reduces unwanted capacitance coupling between receiving electrode 2 and the excitable electrodes 4-1 through 4-10. Metalized layer 76 also acts as a guard. Viewing FIGS. 7, it will be appreciated that feed throughs 71 and 72 are not only in electrical communication with guard 3 and metalized strips Z, but are also in electrical communication with metalized layer 76. It will be remembered that the metalized layers Z are connected to a source of constant potential, such as element 20 of FIG. 3. Thus, metalized layer or guard 76 provides a shield and reduces unwanted capacitance coupling between the excitable electrodes 4-1 through 4-10 and the receiving or center electrode interconnect, namely the metalized strip Y. Metalized strips Z in the lowermost layer reduces unwanted capacitance coupling between the receiving, or center electrode interconnect Y and the excitable electrode interconnects 60 through 69.

The instant invention is shown in FIGS. 8 through 14. It is to be understood, however, common element numbers appearing in FIGS. 1 through 14, identify like structure and therefore will not be redescribed. Additionally, cross-sectional lines A—A, B—B, and C—C of FIG. 8 refer to like cross-sections as described in FIGS., 5, 6, and 7, the only difference being the shape of the electrodes 4-1 to 4-10, the area of the electrodes, vis-a-vis the area of the meter hand 9-10, as hereinafter more fully described.

Figure 8:
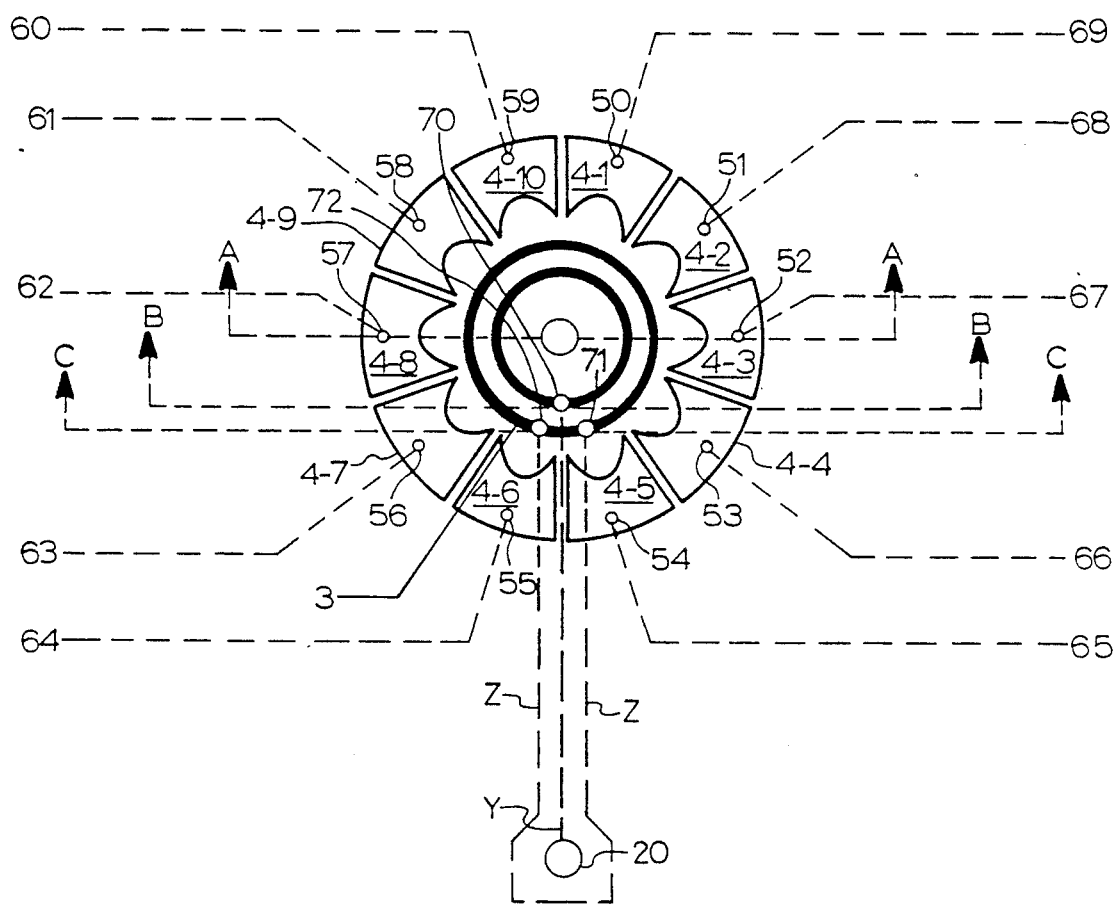
FIG. 8 is a plan view (without meter hand 9, 10) of the electrode array of the invention.

Turning now to the structure shown in FIG. 8, it will be noted that the elements forming the electrode array shown in FIG. 8 are substantially similar to the electrode array described in FIG. 4, except that electrodes 4-1 to 4-10 are generally tooth shaped. Each of the electrodes 4-1 to 4-10 has an electrode center axis which passes through element 50 of electrode 4-1, element 51 of electrode 4-2, element 52 of electrode 4-3, element 53 of electrode 4-4, element 54 of electrode 4-5, element 55 of electrode 4-6, element 56 of electrode 4-7, element 57 of electrode 4-8, element 58 of electrode 4-9 and element 59 of electrode 4-10 respectively. The center electrode axis is one about which the respective electrode is bilaterally symmetrical. It will be noted that each electrode has a free edge 83, which is concave and delimits a part of a center portion. Each electrode 4-1 to 4-10 has lateral free edges 84, such lateral free edges one electrode being spaced apart from like free edges of an adjacent electrode. Electrodes 4-1 to 4-10 are so disposed that concave free edges 83 delimit a center portion in which the receiving electrode 2 and electronic guard 3 are disposed. Apart from the shape of the electrodes 4-1 to 4-10 with their concave free edge, the electrode array shown in FIG. 8 is essentially identical to that shown in FIGS. 4, 5, 6, and 7. However, there is another basic difference that must be considered, namely, the respective areas of electrodes 4-1 to 4-10, (with a concave innermost free edge 83) and meterhand 9-10. For a description of this difference, reference is now made to FIGS. 9A, 9B, 10A, and 10B.

Figure 9A:
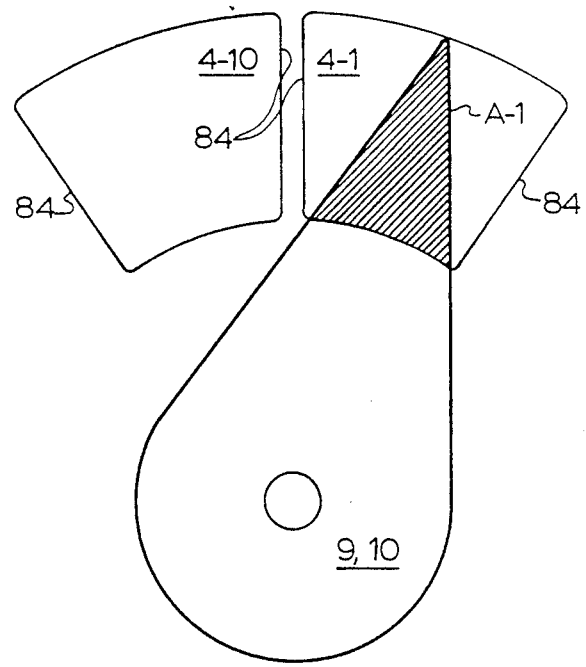
FIGS. 9A and 9B are plan views of a prior art excitable electrode and meter hand and the unequal areas subtended by a terminal portion of the meter hand over the excitable electrode as the meter hand traverses across the face of the electrode.
Figure 9B:
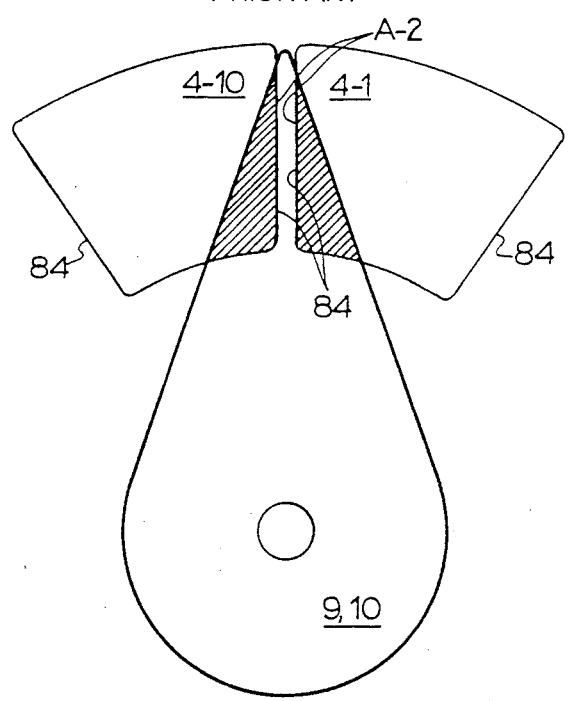
Figure 10A:
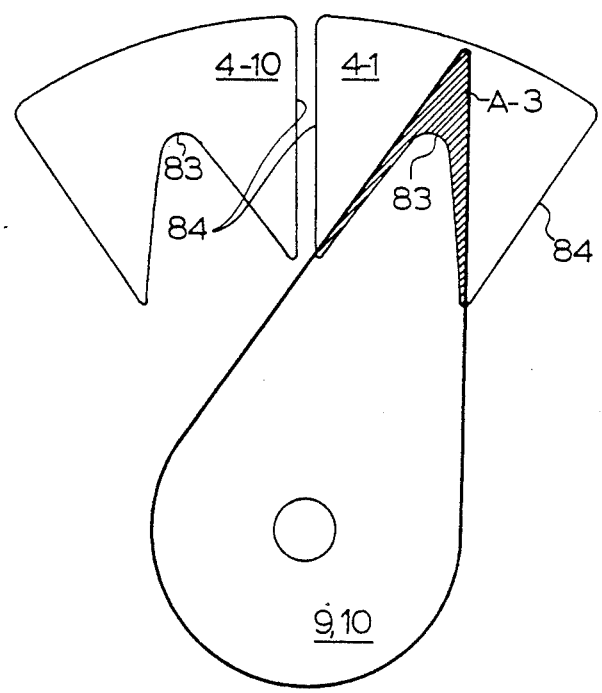
FIGS. 10A and 10B are plan views of the meter hand and excitable electrode of the present invention showing the substantially equal areas of a given electrode subtended by the meter hand as the meter hand traverses across the face of the electrode.
Figure 10B:
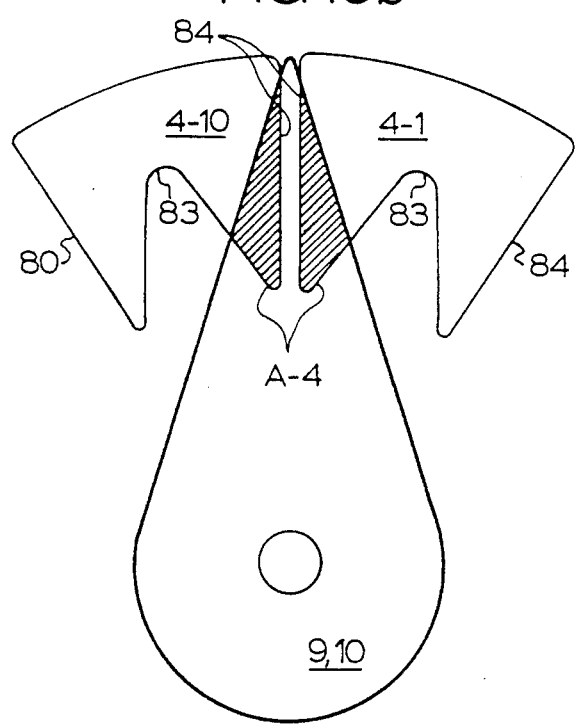

The prior art is shown in FIGS. 9A and 9B. Here it will be noted that when the longitudinal axis of meter hand 9, 10 is coincident with the central electrode axis of electrode 4-1, there is an area of electrode 4-1 subtended by terminal portion of the meter hand 9, 10. This area is shown in crosshatching and denoted A. FIG. 9A should be contrasted with FIG. 9B. When the longitudinal axis of meter hand 9, 10 is in the space between electrode 4-1 and an adjacent spaced apart electrode, the area of electrode 4-1 subtended by the terminal portion of meter hand 9, 10 is that shown in cross hatching as $A^2$ It will be noted that with respect to electrode 4-1, $A^1$ is not equal to $A^2$. This is in contrast with that shown in FIGS. 10A and 10B. Here areas $A^3$ and $A^4$ of electrode 4-1 are substantially the same. For example, when the longitudinal axis of meter hand 9, 10 of FIG. 10A is coincident with the electrode 4-1 center axis, the area subtended by terminal portion of meter hand 9, 10 is shown in crosshatching as $A^3$. When the longitudinal axis of the same meter hand is coincident with the space between an adjacent spaced apart electrode, the area subtended by the terminal portion of meterhand 9, 10 is shown by the cross sectional area denoted $A^4$. In this instance, the respective areas of excitable electrode 4-1 and meter hand 9, 10 are such that $A^3$ is substantially similar to $A^4$. As meter hand 9, 10 is traversed across the face of electrodes 4-1 through 4-10, respective areas of a given electrode subtended by meter hand 9, 10 are substantially equal, as the meter hand 9, 10 is traversed over the face of any given electrode.

Figure 11:
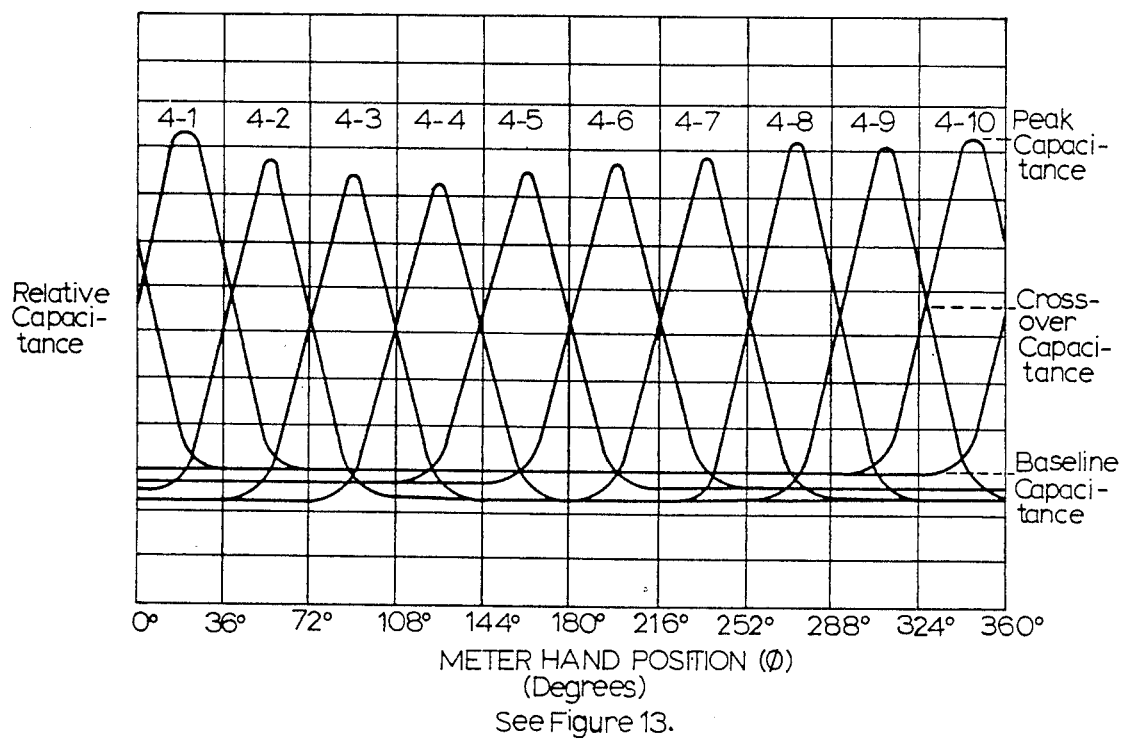
FIG. 11 is a graph of the peak capacitance, crossover capacitance and base-line capacitance of prior art electrodes and meter hands like that of FIG. 4.
Figure 12:
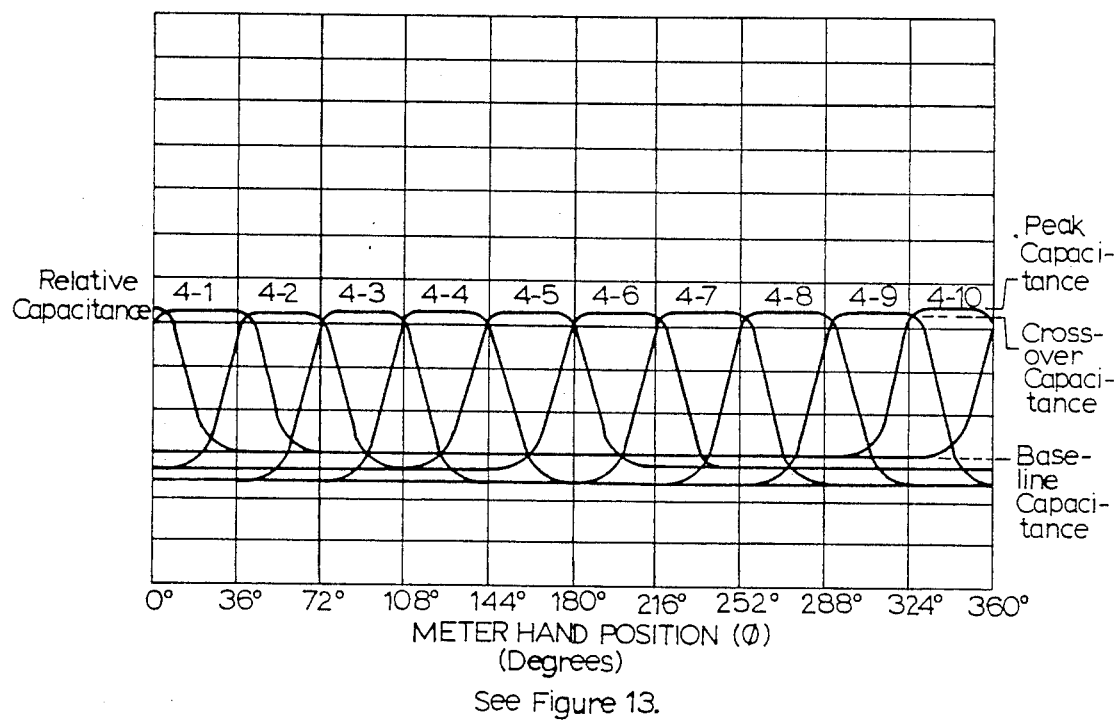
FIG. 12 is a graph of the peak capacitance, crossover capacitance and base-line capacitance arising out of the disclosed invention.
Figure 13:
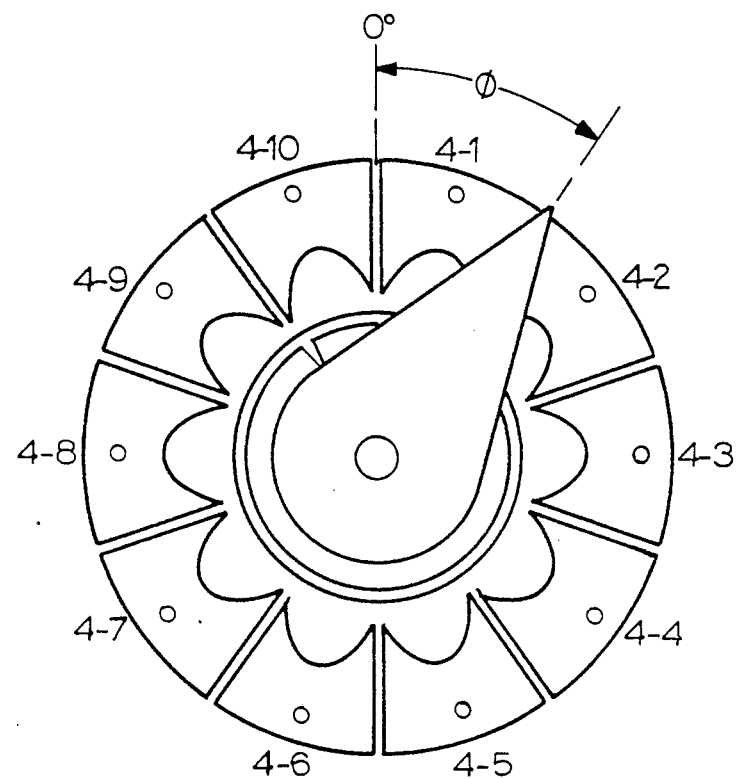
FIG. 13 is a plan view of the electrode array of the invention showing the meter hand in the position shown by FIG. 10B.
Figure 14A:
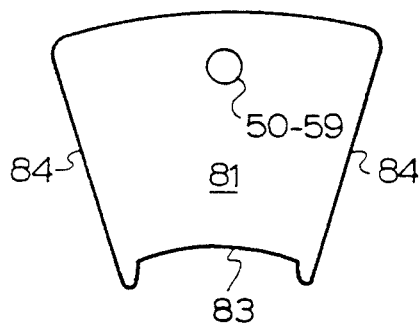
FIGS. 14A and 14B are different embodiments of excitable electrodes 4-1 to 4-10.
Figure 14B:
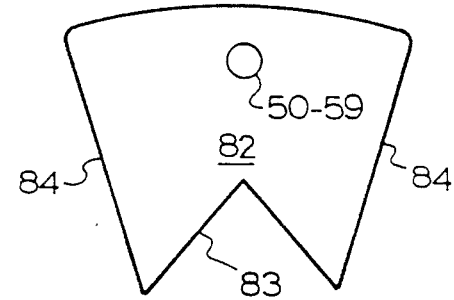

Functionally, the electrode array shown in FIGS. 8 and 13 operate essentially identical to the method previously described for FIGS. 1 through 7. Improved excitable electrodes of FIG. 8 differs from the excitable electrodes of FIG. 4 in that all points on the curved edge of the excitable electrode 83 closest to the receiving electrode 3 will no longer be equal distance from the receiving electrode. In the improved electrode array, points near the middle of the curved free edge 83 actually are further from the receiving electrode when compared to the same points from the ends of the curved electrode. By making free edge 83 concave (as contemplated by the shapes shown in FIGS. 8, 10A and 10B), meter hand 9, 10 subtends areas of substantially equal value as the meter hand traverses the face of any given electrode. In the prior art, respective areas are not equal, see FIGS. 9A and 9B. This resulted in a greater capacitance present when the meter hand was positioned directly over the excitable electrode (FIG. 9A) compared to the capacitance present when longitudinal axis of the meter hand was coincident with the space between adjacent spaced apart electrodes. FIG. 11 is a graph showing the relative capacitance between each of the ten excitable electrodes and the receiving electrode with respect to electrode array as shown by FIG. 4. FIG. 11 also illustrates that with electrode array of FIG. 4, the difference between the capacitance cross over points and the peak capacitance points is relatively large. On the other hand, FIG. 12 illustrates the meter hand angular displacement for selected hand positions on the improved electrode array of the present invention. It shows respective relative capacitance between each of the ten excitable electrodes and receiving electrode with respect to the hand position. FIG. 12 also illustrates the smaller difference between the capacitance cross-over points and the peak capacitance points within this improved electrode structure. Reference is made to FIGS. 14A and 14B. Electrodes 81 and 82 are equivalents to electrodes 4-1 to 4-10 of FIGS. 8 and 13.

In all cases, it is to be understood that the above described embodiment is illustrative of one of many possible specific embodiments which may represent the principal of this invention. Numerous and various other embodiments can be devised readily in accordance with these principals by those skilled in the art without departing from the spirit and scope of this invention.

What is claimed is:

1. An electrode array comprising a substrate having first and second surfaces on which there is disposed on said first surface:
   (a) adjacent electrodes spaced apart from one another delimiting a center portion and an aperture in said substrate located in said center portion;
   (b) a center electrode, having an aperture therein, in said center portion; and
   (c) an axle, disposed in the apertures of the center electrode and substrate, and a meter hand affixed to the axle, each adjacent electrode and said meter hand having predetermined shape and respective areas so that the area of any given member of said adjacent electrodes subtended by said meter hand is substantially constant as the axle is rotated and the meter hand is traversed across said adjacent electrodes.

2. The electrode array of claim 1 further including a guard, said guard being composed of a first conductive strip and spaced apart from and disposed between said center electrode and said said plurality of electrodes.

3. The electrode array of claim 2 further including second, third, and fourth conductive strips, said second conductive strip disposed on said second surface and in electrical communication with the center electrode and said third and fourth conductive strips in electrical communication with said guard, said third and fourth conductive strips disposed on said second surface, spaced apart from and positioned laterally on opposite sides of said second conductive strip.

4. The electrode array of claim 2 further including a D.C. reference voltage potential in electrical communication with said guard and said center electrode for supplying essentially the same D.C. reference voltage to both.

5. The electrode array of claim 1 wherein said substrate contains a first feed through device that electrically connects said center electrode on said first surface to said second conductive strip on said second surface.

6. The electrode array of claim 3 wherein said substrate further contains second and third feed through devices that electrically connects said guard on said first surface to the third and fourth conductive strips on said second surface.

7. The electrode array of claim 6 wherein said substrate is composed of a first layer of dielectric material, a second layer of conductive material, and a third layer of dielectric material, wherein said second and third feed throughs are in electrical contact with said second layer of conductive material.

8. The electrode array of claim 7 further including a D.C. reference potential in electrical communication with said second and third feed through devices.

* * * * *